Patented Apr. 30, 1935

1,999,438

UNITED STATES PATENT OFFICE 1,999,438

UNSULPHONATED AZO-DYESTUFF AND PROCESS OF MAKING SAME

Gérald Bonhôte, Basel, and Max Schmid, Riehen, near Basel, Switzerland, assignors to the firm of Society of Chemical Industry in Basle, Basel, Switzerland No Drawing. Application January 9, 1934, Serial No. 705,954. In Switzerland January 16, 1933

7 Claims. (Cl. 260—76)

This invention relates to the manufacture of valuable new dyestuffs by coupling an arylide of a carboxylic acid, which is capable of being coupled owing to the presence of a —CO—CH$_2$— group, with a diazotized ortho-aminocarboxylic acid or an ester thereof.

Greenish yellow to orange dyestuffs are thus produced. They correspond very probably to the general formula $$[R_1-N=N-]_2R_2$$

wherein $R_1$ represents any aromatic radical substituted in ortho-position to the —N=N—group by a COO-alkyl group and $R_2$ the radical of an arylide of a carboxylic acid containing twice a —CO—CH$_2$—group capable of coupling. When produced on the fibre the new dyestuffs yield greenish-yellow to orange dyeings which are of extraordinary brightness and depth and have excellent properties of fastness, especially to washing, chlorine and soda boil, which is remarkable in view of the presence of the carboxylic acid ester group which is easily saponified to the carboxyl-group. Moreover, the dyeings which are produced by dyestuffs made from diazotized esters of ortho-aminocarboxylic acid are characterized by fastness to light. These results are the more noteworthy because the dyestuffs which are obtained from the corresponding para- or meta-aminocarboxylic acids or their esters are far from having the fastness of those from the ortho-derivatives.

The arylides of the carboxylic acids capable of coupling which act here as coupling components and contain twice the —CO—CH$_2$—group capable of coupling may not only comprise arylides from 1 mole of a diamine and 2 moles of a monocarboxylic acid containing only once the —CO—CH$_2$—group capable of coupling, but also arylides from 2 moles of a mono-amine and 1 mole of a dicarboxylic acid containing twice the —CO—CH$_2$—group capable of coupling. The —CO—CH$_2$—group may be in an open chain, but it may also be a member of a ring. Such arylides are, for example, the following compounds:—

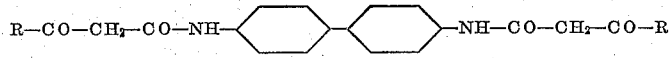

wherein R stands for alkyl, such as methyl or ethyl or for aralkyl or for aryl; further

wherein R stands for an aryl radical of the benzene or naphthalene series. These are compounds in which the —CO—CH$_2$—group is in an open chain. In compounds such as

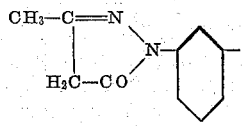 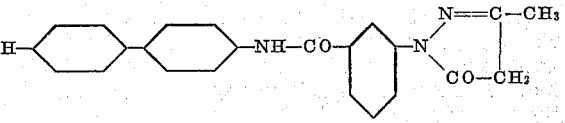

or the —CO—CH$_2$—group lies in a ring.

In the group COO-alkyl of the diazotizing component the alkyl may not only consist of one or two C-atoms, but also of a higher alkyl radical, such as propyl, isobutyl, amyl, capryl, decyl, cetyl, etc. The alkyl group may also be substituted by substituents, such as halogen, OH, OCH$_3$.

The new dyestuffs are useful for producing valuable lakes or pigments, if desired with the aid of substrata or after they have been converted into complex metal compounds, such as copper or chromium compounds.

The following examples illustrate the invention the parts being by weight, unless otherwise stated:—

Example 1

33 parts of 2-aminobenzoic acid-ethyl ester are diazotized in the usual manner. The clear diazo-solution thus obtained is poured into a solution consisting of 59.2 parts of the condensation product from 2 moles of 1-(3'-carboxyphenyl)-3-methyl-5-pyrazolone and 1 mole of 4,4'-diamino-diphenyl, 30 parts of caustic soda solution of 30 per cent. strength, 25 parts of calcined sodium carbonate and 2000 parts of water. The dyestuff thus formed is immediately precipitated. The yellow precipitate is filtered and dried. The new dyestuff corresponds probably to the formula

Example 3

Cotton yarn is impregnated with a grounding liquor made by dissolving 3 grams of diacetacetyl-ortho, ortho'-tolidine in 300 cc. of hot water with addition of 10 cc. of caustic soda solution of 30 per cent. strength, 10 cc. of Turkey red oil and 14 grams of sodium chloride and diluting the whole to 1 litre. The goods are then wrung out and developed in a diazo-solution which has been neutralized with sodium acetate and contains the

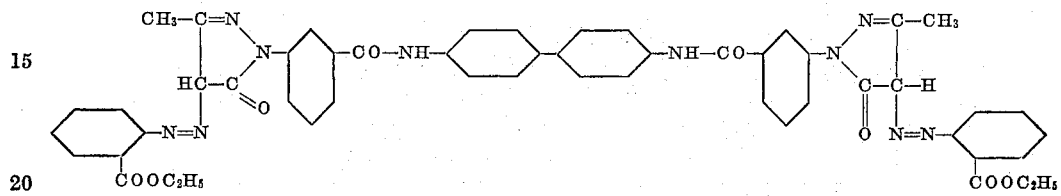

Example 2

Cotton yarn is impregnated with a grounding liquor made by dissolving 3 grams of diacetacetyl-ortho, ortho'-tolidine in 300 cc. of hot water with addition of 10 cc. of caustic soda solution of 30 per cent. strength, 10 cc. of Turkey red oil and 14 grams of sodium chloride and the whole diluted to 1 litre. The goods are then wrung out and developed in a diazo-solution neutralized by means of sodium bicarbonate and equivalent to 2 grams of 5-chloro-2-aminobenzoic acid per litre. There is produced a pure greenish-yellow of very good fastness to washing, chlorine and keir boiling. The new dyestuff corresponds probably to the formula equivalent of 2 grams of 2-aminobenzoic acid-ethyl ester per litre. There is produced a dull, pure greenish yellow tint of very good fastness to light and to keir boiling. The new dyestuff corresponds probably to the formula

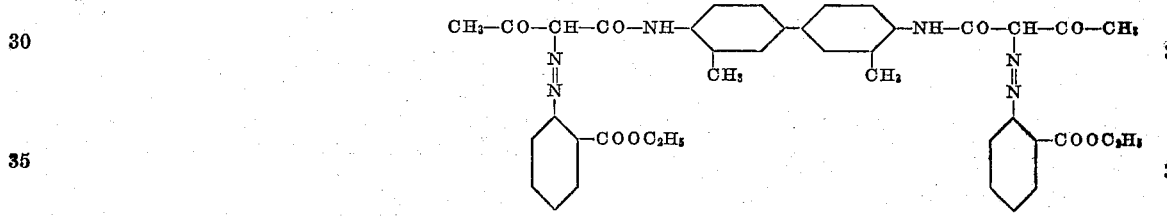

Example 4

The material to be printed is foularded with an alkaline solution which contains per litre 12 grams of dibenzoylacetyl-ortho, ortho'-tolidine. After drying, the material is printed with a printing color which contains per kilo 8 grams of the diazotized methyl ester of 2-amino-5-chloro-1-benzoic acid. The pure yellow dyeing develops very quickly and is notably fast. The new dyestuff corresponds probably to the formula

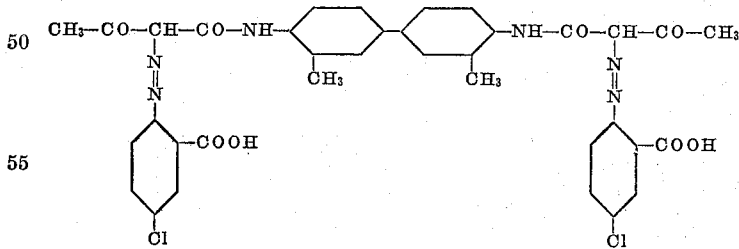

Redder tints are obtained by substituting the benzidide of the 1-(3'-carboxyphenyl)-3-methyl-5-pyrazolone for the diacetacetyl-ortho, ortho'-tolidine.

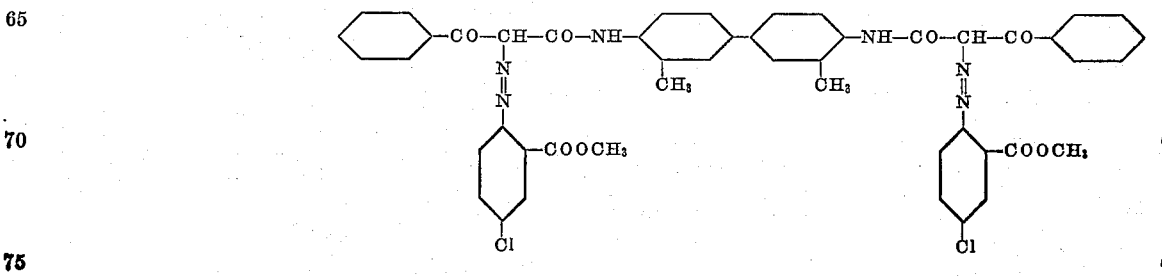

The following table comprises a number of other dyestuffs which are obtainable in accordance with this invention:—

| No. | Diazo-component | Coupling component | Color tint of the combination produced on cotton |
|---|---|---|---|
| 1 | 5-chloro-2-amino-benzoic acid-methyl ester | Diacetacetyl-ortho, ortho'-tolidine | Greenish-yellow. |
| 2 | 4-chloro-2-amino-benzoic acid-methyl ester | do | Yellow. |
| 3 | 2-aminobenzoic acid-methyl ester | do | Reddish-yellow. |
| 4 | 2-aminobenzoic acid-ethyl ester | Dibenzoylacetyl-ortho, ortho'-tolidine | Red yellow. |
| 5 | 2-amino-5-chloro-benzoic acid-methyl ester | do | Do. |
| 6 | 2-amino-4-chloro-benzoic acid-ethyl ester | do | Orange. |
| 7 | 2-amino-4-chloro-benzoic acid-methyl ester | Dibenzoylacetyl-ortho, ortho'-tolidine | Do. |
| 8 | 2-aminobenzoic acid-ethyl ester | Terephthaloyl-bis-acetyl-1-amino-4-methylbenzene | Green yellow. |
| 9 | 2-amino-4-chloro-benzoic acid ethyl ester | do | Do. |
| 10 | 2-amino-4-chloro-benzoic acid-ethyl ester | Terephthaloyl-bis-acetyl-1-amino-4-methoxybenzene | Do. |
| 11 | 2-amino-4-chloro-benzoic acid-ethyl ester | do | Yellow. |
| 12 | 2-aminobenzoic acid-ethyl ester | Terephthaloyl-bis-acetyl-1-amino-2-methoxy-5-methyl-benzene. | Green yellow. |
| 13 | 2-amino-5-chloro-benzoic acid-methyl ester | do | Yellow. |
| 14 | 2-amino-4-chloro-benzoic acid-ethyl ester | do | Green yellow. |
| 15 | 2-aminobenzoic acid-ethyl ester | Terephthaloyl-bis-acetyl-2-amino-naphthalene | Yellow. |
| 16 | 2-amino-4-chloro-benzoic acid-ethyl ester | do | Do. |
| 17 | 2-amino-5-chloro-benzoic acid-methyl ester | Terephthaloyl-bis-acetyl-1-amino-naphthalene | Red yellow. |
| 18 | 2-aminobenzoic acid-ethyl ester | Terephthaloyl-bis-acetyl-1-amino-4-chlorobenzene | Green yellow. |
| 19 | 2-amino-4-chloro-benzoic acid-ethyl ester | Terephthaloyl-bis-acetyl-1-amino-4-ethoxybenzene | Yellow. |
| 20 | 2-aminobenzoic acid-ethyl ester | Terephthaloyl-bis-acetyl-1-amino-2,4-dimethoxy-5-chlorobenzene. | Do. |

Dyestuff 14 corresponds to the following formula

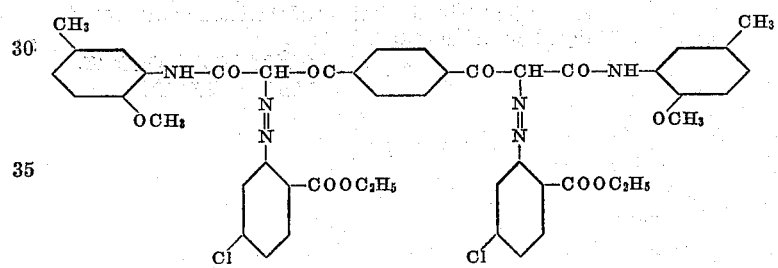

What we claim is:—

1. The unsulphonated azo-dyestuffs of the general formula $$[R_1-N=N-]_2-R_2$$

wherein $R_1$ represents any aromatic radical of the benzene or naphthalene series substituted in ortho-position to the —N=N—group by a COO-alkyl group, and $R_2$ represents the radical of an arylide of a carboxylic acid containing twice the —CO—CH$_2$—group capable of coupling, which products, when produced on the fibre, dye the same vivid greenish-yellow to orange tints of excellent fastness to soda boil.

2. The unsulphonated azo-dyestuffs of the general formula $$[R_1-N=N-]_2-R_2$$

wherein $R_1$ represents any aromatic radical of the benzene series substituted in ortho-position to the —N=N—group by a COO-alkyl group, and $R_2$ represents the radical of an arylide of a carboxylic acid containing twice the —CO—CH$_2$—group capable of coupling, which products, when produced on the fibre, dye the same vivid greenish-yellow to orange tints of excellent fastness to soda boil.

3. The unsulphonated azo-dyestuffs of the general formula $$[R_1-N=N-]_2-R_2$$

wherein $R_1$ represents any aromatic radical of the benzene series substituted in ortho-position to the —N=N—group by a COO-alkyl group, and $R_2$ represents the radical of an arylide of a carboxylic acid containing twice the —CO—CH$_2$—group capable of coupling in an open chain, which products, when produced on the fibre, dye the same vivid greenish-yellow to orange tints of excellent fastness to soda boil.

4. The unsulphonated azo-dyestuffs of the general formula $$[R_1-N=N-]_2-R_2$$

wherein $R_1$ represents any aromatic radical of the benzene series substituted in ortho-position to the —N=N—group by a COO-alkyl group, the alkyl containing not more than 2 carbon atoms, and $R_2$ represents the radical of an arylide of a carboxylic acid containing twice the —CO—CH$_2$—group capable of coupling in an open chain, which products, when produced on the fibre, dye the same vivid greenish-yellow to yellow tints of excellent fastness to soda boil.

5. The azo-dyestuff of the formula

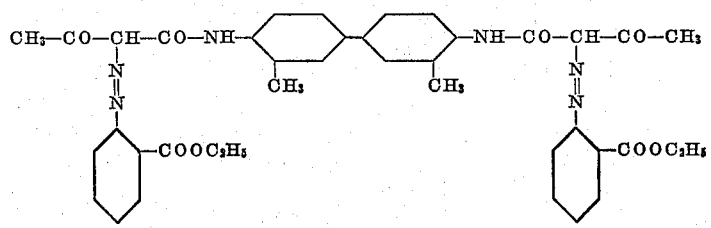

which product, when produced on the fibre, dyes the same fast yellow tints of particular fastness to light, chlorine and soda boil.

6. The azo-dyestuff of the formula which product, when produced on the fibre, dyes the same fast yellow tints of particular fastness to light, chlorine and soda boil.

7. The azo-dyestuff of the formula

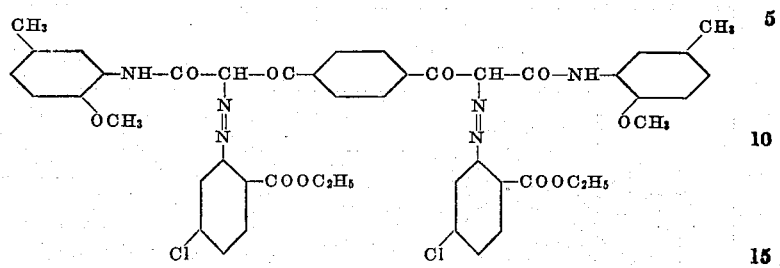

which product, when produced on the fibre, dyes the same fast yellow tints of particular fastness to light, chlorine and soda boil.

GÉRALD BONHÔTE.
MAX SCHMID.